United States Patent
Kawano

(10) Patent No.: US 9,258,446 B2
(45) Date of Patent: Feb. 9, 2016

(54) IMAGE PROCESSING APPARATUS

(71) Applicant: FUJI XEROX CO., LTD., Tokyo (JP)

(72) Inventor: Hiroyuki Kawano, Ashigarakami-gun (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/516,042

(22) Filed: Oct. 16, 2014

(65) Prior Publication Data

US 2015/0103363 A1     Apr. 16, 2015

(30) Foreign Application Priority Data

Oct. 16, 2013   (JP) ................................. 2013-215726
Oct. 16, 2013   (JP) ................................. 2013-215727

(51) Int. Cl.
*H04N 1/00*       (2006.01)

(52) U.S. Cl.
CPC ....... *H04N 1/00769* (2013.01); *H04N 1/00718* (2013.01); *H04N 1/00742* (2013.01); *H04N 1/00785* (2013.01)

(58) Field of Classification Search
CPC .......... H04N 1/00045; H04N 1/00278; H04N 2201/04717; H04N 2201/04718; H04N 2201/04751; H04N 1/047; H04N 2201/04793; H04N 1/00769; H04N 1/00718; H04N 1/00742; H04N 1/00785; G06K 15/021; G06K 15/1204
USPC .................................................. 358/1.12, 1.1
See application file for complete search history.

(56) References Cited

U.S. PATENT DOCUMENTS 6,005,977 A * 12/1999 Tanimizu et al. .............. 382/216
2014/0314281 A1* 10/2014 Kojima .................. G06T 7/0008
                                                                  382/112

FOREIGN PATENT DOCUMENTS

| JP | H07-249122 A | 9/1995 |
| JP | H09-035063 A | 2/1997 |
| JP | H10-289311 A | 10/1998 |
| JP | 2000-082135 A | 3/2000 |
| JP | 2003-094594 A | 4/2003 |
| JP | 2005-208847 A | 8/2005 |

* cited by examiner

*Primary Examiner* — Iriana Cruz
(74) *Attorney, Agent, or Firm* — Oliff PLC

(57) ABSTRACT

An image processing apparatus, includes: an acceptance unit that accepts image data and reading data read from a medium; an extraction unit that extracts a rectangular image by segmenting one image of the image data and the reading data to have a size calculated based on an error; a searching unit that searches for a matching position of a rectangular image in the other image of the image data and the reading data, which corresponds to a position of the rectangular image extracted by the extraction unit within a range of a movement amount calculated based on the size of the rectangular image extracted by the extraction unit and a predetermined size calculated by the error; and a comparison unit that compares the rectangular image extracted by the extraction unit with the rectangular image in the other image at the position searched by the searching unit.

8 Claims, 11 Drawing Sheets

FIG. 13
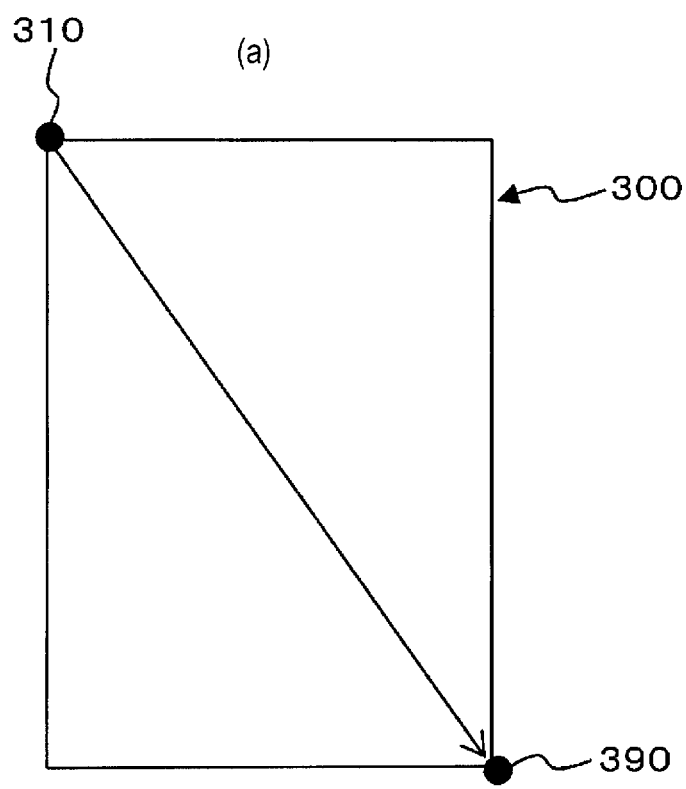
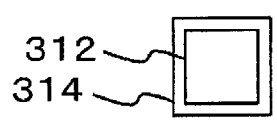
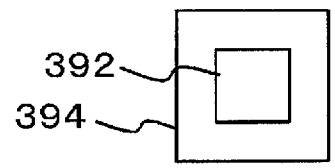

IMAGE PROCESSING APPARATUS

CROSS-REFERENCE TO RELATED APPLICATIONS

This application is based on and claims priority under 35 U.S.C. 119 from Japanese Patent Application Nos. 2013-215726 and 2013-215727, filed on Oct. 16, 2013.

BACKGROUND

Technical Field

The present invention relates to an image processing apparatus.

SUMMARY

According to an aspect of the present invention, it provides an image processing apparatus, includes: an acceptance unit that accepts image data and reading data read from a medium on which an image of the image data is formed; an extraction unit that extracts a rectangular image by segmenting one image of the image data and the reading data to have a size calculated based on an error which occurs from an image forming apparatus forming the image of the image data on the medium and/or an image reading apparatus reading the medium; a searching unit that searches for a matching position of a rectangular image in the other image of the image data and the reading data, which corresponds to a position of the rectangular image extracted by the extraction unit within a range of a movement amount calculated based on the size of the rectangular image extracted by the extraction unit and a predetermined size calculated by the error; and a comparison unit that compares the rectangular image extracted by the extraction unit with the rectangular image in the other image at the position searched by the searching unit.

BRIEF DESCRIPTION OF THE DRAWINGS

Exemplary embodiment(s) of the present invention will be described in detail based on the following figures, wherein

FIG. 13 is an explanation diagram illustrating an example of a size of a search range based on a position within an image;

DETAILED DESCRIPTION

Hereinafter, an example of one embodiment suitable to realize the present invention will be described with reference to the accompanying drawings.

Figure 1:
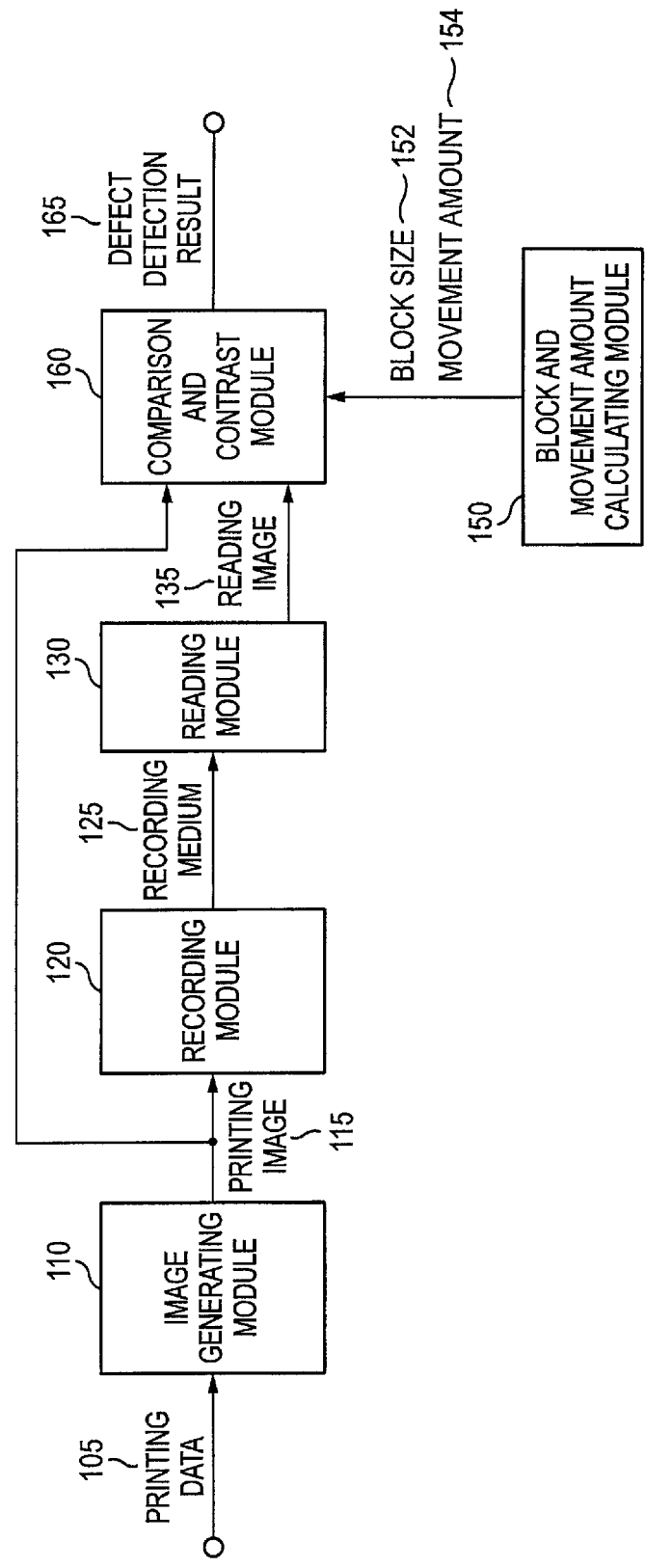
FIG. 1 is a conceptual module configuration diagram of a first embodiment of the present invention.

FIG. 1 illustrates a conceptual module configuration diagram of a configuration example according to the present embodiment.

Meanwhile, a module generally indicates parts such as logically separable software (computer program) and hardware. Therefore, the module according to the present embodiment indicates not only a module in the computer program but also a module in a hardware configuration. For this reason, the present embodiment describes computer programs (program allowing a computer to execute each order, program executing a computer as each means, and program allowing a computer to carrying out each function), a system, and a method functioning as these modules. However, for convenience of explanation, 'storing', 'store', and words equivalent thereto are used, and in the case in which the embodiment is the computer program, these words mean storing the computer program in a storage apparatus or controlling to store the computer program in the storage apparatus. Further, the modules may be allowed to one-to-one correspond to the functions, but in mounting, one module may be allowed to be configured as one program, a plurality of modules may be allowed to be configured as one program, and to the contrary, one module may be allowed to be configured as a plurality of programs. Further, the plurality of modules may be allowed to be executed by one computer and according to a computer in a dispersion or parallel environment, one module may be allowed to be executed by the plurality of computers. Meanwhile, one module may be allowed to include another module. Further, hereinafter, a 'connection' is used even in the case of a logical connection (transfer and instruction of data, reference relationship between data, and the like), in addition to a physical connection. A 'predetermined' means that an object is defined prior to being processed, and even after processing according to the present embodiment starts as well as before the processing according to the present embodiment starts, if the object is not yet processed, a 'predetermined' is used including a meaning that object is defined depending on a situation and a state at that time or a situation and a state till then. When a plurality of 'predetermined values' is present, different values may be allowed and more than two values (of course, including all values) may be allowed to be the same. Further, a description having a meaning named 'if A, B is performed' is used as a meaning of 'when determined to be A by determining whether or not it is A, B is performed'. However, the case in which it is unnecessary to determine whether or not it is A is ruled out.

A system or an apparatus includes not only a configuration in which a plurality of computers, hardware, an apparatus, and the like are connected to one other by a communication means such as a network (including communication connection of one-to-one correspondence), but also a case which is realized by one computer, hardware, an apparatus, and the like. 'Apparatus' and 'system' are used as a term having the same meaning. As a matter of course, a 'system' does not include components belonging to only a social 'structure' (social system) which is an artificial engagement.

Whenever each module performs processing or in the case in which a plurality of processings is performed within a module, targeted information is read from a storage apparatus for each processing, the processing is performed, and then the processed result is delivered to the storage apparatus. Therefore, a description about reading the targeted information from the storage apparatus before processing is performed and transferring the targeted information after processing to the storage apparatus may be omitted. Meanwhile, examples of the storage apparatus herein may include a hard disk, a random access memory (RAM), an external storage medium, a storage apparatus through a communication line, a register within a central processing unit (CPU), and the like.

First Embodiment

FIG. 1 is a conceptual module configuration diagram of a first embodiment of the present invention.

An image processing system including an image processing apparatus according to the first embodiment compares an image data with a reading data. As illustrated in an example of FIG. 1, the image processing system includes an image generating module 110, a recording module 120, a reading module 130, a comparison and contrast module 160, and a block and movement amount calculating module 150.

The image generating module 110 is connected to the recording module 120 and the comparison and contrast module 160. The image generating module 110 converts a printing data 105 into a printing image 115 which is an image data. The conversion processing includes image conversion processing required for printing which includes rasterize and color space conversion. The image generating module 110 performs processing of converting the printing data 105 described as a PDL such as a portable document format (PDF) (registered mark) into a raster image (printing image 115) which may be recorded on a medium (paper) with a printing machine and a printer. As a mounting form, there are dedicated hardware and software which is operated on a computer such as a personal computer (PC). The printing image 115 which is a processed result is delivered to the recording module 120 and the comparison and contrast module 160.

The recording module 120 is connected to the image generating module 110 and the reading module 130. The recording module 120 records the printing image 115 on a recording medium 125. That is, an image of the image data is formed on the recording medium 125 which is a medium. This is so-called printing, or print out and the recording module 120 is realized as a printer which is an image forming apparatus.

The reading module 130 is connected to the recording module 120 and the comparison and contrast module 160. The reading module 130 converts the printing image 115 on the recording medium 125 into a reading image 135 by photoelectric conversion, and the like. That is, the reading image 135 which is the data read from the recording medium 125 is generated. This is so-called scan out and the reading module 130 is realized as a scanner which is an image reading apparatus.

The comparison and contrast module 160 is connected to the image generating module 110, the reading module 130, and the block and movement amount calculating module 150. The comparison and contrast module 160 compares and contrast the printing image 115 with the reading image 135 to detect whether defects are present and an area in which defects occurs. That is, the comparison and contrast module 160 accepts the printing image 115 and the reading image 135. The reading image 135 is read from the recording medium 125 on which an image of the printing image 115 is formed. That is, the comparison and contrast module 160 receives the original printing image 115 which is a print out target and the reading image 135 which is obtained by printing out the printing image 115 and scanning the printed out recording medium 125. This is to check whether defects occurring by the recording module 120 and the reading module 130 are present. Herein, the defect is called noise and ideally, completely matches the printing image 115 and the reading image 135. However, the defects occur due to maintenance situations of the recording module 120 and the reading module 130, and the like. Meanwhile, errors may occur in the recording module 120 and the reading module 130. Herein, an 'error which may occur' is an error which is tolerable in a design specification of the recording module 120 and the reading module 130. Examples of the error include, in detail, an affine transformation of expansion and contraction, rotation, and movement. As the error, for example, when the design specification in which the rotation is not generated at an x degree or more is realized (a design target is achieved), the rotation below the x degree may be generated.

Therefore, the comparison and contrast module 160 is to extract the defects (for example, black pixel mixing of 3 pixels or more) except for errors which may occur from the recording module 120 and the reading module 130. That is, it is checked whether defects other than the errors, which are tolerable in the design specification, occur, to specify positions at which the defects occur, thereby assisting the maintenance of the recording module 120 and the reading module 130.

Figure 4:
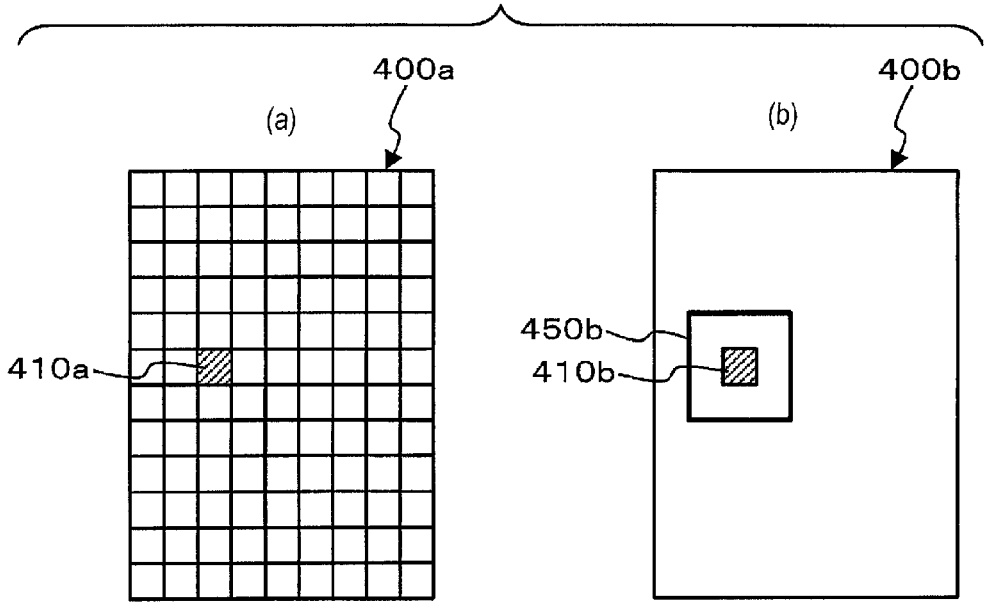
FIG. 4 is an explanation diagram illustrating the processing example according to the first embodiment of the present invention.

The comparison and contrast module 160 segments one image of the printing image 115 and the reading image 135 in a rectangular (hereinafter, referred to as a block) which is generated based on errors which may occur from the recording module 120 forming the image of the printing image 115 in the recording medium 125 or the reading module 130 reading the recording medium 125, thereby extracting a rectangular image. One image may be any one of the printing image 115 and the reading image 135. Hereinafter, the printing image 115 considered as one image and the reading image 135 considered as the other image will be mainly described. A block segmentation will be described with reference to FIG. 4. FIG. 4 is an explanation diagram illustrating a processing example according to the present embodiment. In an example of (a) of FIG. 4, a reference image 400a is segmented into 9×12 blocks. As a matter of course, a segmented number is changed depending on a block size and a size of the reference image 400a. Further, according to the relationship between the block size and the size of the reference image 400a, the segmented number may not be necessarily segmented into an integer number, but for example, a portion which is not occupied in one block may be added with a white image, and the like. Further, the comparison and contrast module 160 accepts a block size 152 from the block and movement amount calculating module 150 and segments the accepted the block size into a block.

Figure 5:
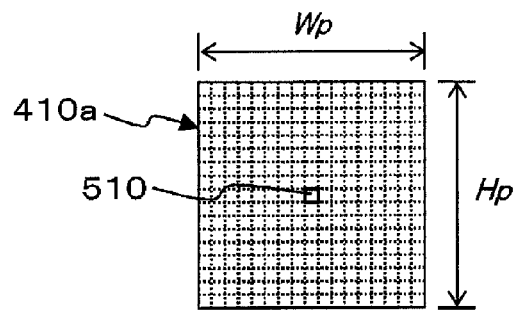
FIG. 5 is an explanation diagram illustrating a block example.

FIG. 5 is an explanation diagram illustrating a block example and enlargedly illustrates a block image 410a illustrated in an example of (a) of FIG. 4. The block image 410a has a size of $W_p \times H_p$. Further, coordinates of a central pixel 510 of the block image 410a are set to be $C_x$ and $C_y$.

Next, the comparison and contrast module 160 searches for the extracted rectangular image within a range of the movement amount generated based on the error within the other image. For example, (b) of FIG. 4 illustrates an example of searching for the block image 410a illustrated in (a) of FIG. 4. As illustrated in (b) of FIG. 4, the comparison and contrast module 160 searches for the block image 410a within a search range 450b which is a 'range of movement amount' within a reading image 400b. Meanwhile, the block image 410b within the reading image 400b corresponds to the block image 410a within the reference image 400a. Ideally, (when errors which may occur from the recording module 120 and the reading module 130 are 0), the defects are detected only by comparing the block image 410a with the block image 410b, but since the errors, which may occur from the recording module 120 and the reading module 130, are actually present, the search is performed within the search range 450b considering the errors. Therefore, it is possible to find a position which matches the block image 410a within the reading image 400b without the need to search for the overall reading image 400b. The search range is an area formed as the vertical and horizontal movement amount with a rectangle of the other image being centered, including the rectangle of the other image in the same position as the rectangular position of said one image.

Figure 6:
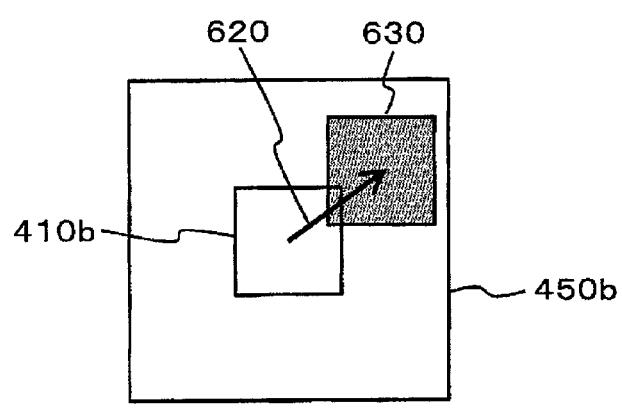
FIG. 6 is an explanation diagram illustrating the processing example using a comparison and contrast module.

The search processing will be described with reference to FIG. 6. FIG. 6 is an explanation diagram illustrating a processing example by the comparison and contrast module 160. An example illustrated in FIG. 6 enlargedly illustrates the search range 450b illustrated in an example of (b) of FIG. 4. The block image 410a of the reference image 400a moves by one pixel within the search range 450b of the reading image 400b to perform template matching. Further, as the result of the template matching, a relative position to the block image having a largest score which demonstrates most approximation within the search range becomes a displacement amount 620. That is, the block image 410b corresponds to the block image 410a within the search range 450b, and as the result of performing the template matching of the block image within the search range 450b with the block image 410a, when a block image 630 at a largest score position is extracted, the relative position becomes the displacement amount 620. Meanwhile, the comparison and contrast module 160 accepts a movement amount 154 from the block and movement amount calculating module 150 to define the search range using the movement amount 154, thereby searching for the targeted block.

Next, the comparison and contrast module 160 compares the extracted rectangular image with the image of the search result, based on the position in the search result as the displacement amount. The 'search result' is a result of extracting a position at which one image best matches the other image by comparing the rectangular images within the one image, in the search range of the other image. A difference between the position and a position of the rectangular image may be set to be the displacement amount. The 'compare' may include using the search result. That is, since the search result is the best matched case, the matched degree may be set as a defect detection result 165. Further, the defect detection result 165 may include the displacement amount in addition to the matched degree.

The block and movement amount calculating module 150 is connected to the comparison and contrast module 160. The block and movement amount calculating module 150 calculates the block size 152 and the movement amount 154 based on the error which may occur from the recording module 120 or the reading module 130. Further, the block size 152 and the movement amount 154 are delivered to the comparison and contrast module 160. Examples of the error of the recording module 120 or the reading module 130 include the affine transformation in an image forming apparatus or an image reading apparatus. In a detailed example, the error includes an expansion and contraction rate, a rotation angle, and the like. Meanwhile, the processing by the block and movement amount calculating module 150 is sufficient to be carried out prior to carrying out the processing by the comparison and contrast module 160 and the block size 152 and the movement amount 154 may be previously calculated and stored in the comparison and contrast module 160. Further, to cope with the errors from the recording module 120 and the reading module 130 which are used at that time, the block and movement amount calculating module 150 may accept errors from the recording module 120 and the reading module 130 to calculate the block size 152 and the movement amount 154 each time.

The block size 152 is set so that a pixel shift between the rectangular image of one image and the rectangular image of the other image is within one pixel due to the affine transformation. Meanwhile, the calculation of the block size 152 will be described with reference to an example of FIG. 8.

Figure 7:
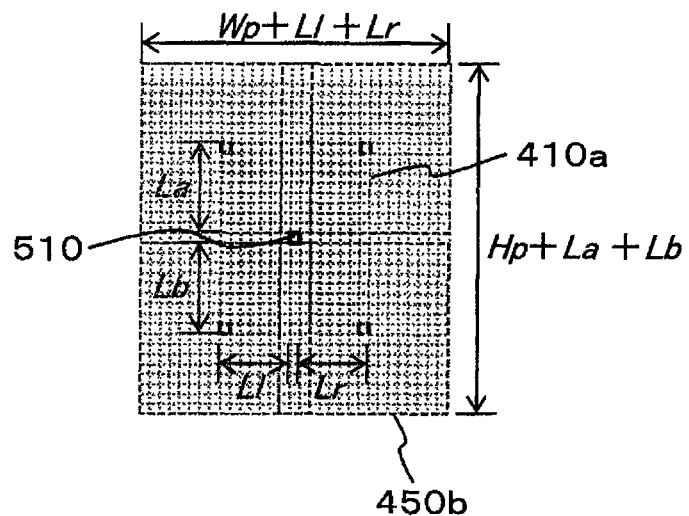
FIG. 7 is an explanation diagram illustrating a relation example between a block image and a search range.

In the size of the printing image 115 or the reading image 135, the movement amount 154 due to the affine transformation is defined to be maximal. The movement amount 154 is to form the search range 450b. FIG. 7 is an explanation diagram illustrating a relation example between the block image 410a and the search range 450b. The movement amount 154 includes, in detail, an upper direction movement amount, a lower direction movement amount, a left direction movement amount, and a right direction movement amount.

A length (block height) of the block image 410a is $L_a+1+L_b$ and is $H_p$ illustrated in an example of FIG. 5.

A width (block width) of the block image 410a is $L_1+1+L_r$ and is $W_p$ illustrated in the example of FIG. 5.

The length (height of the search range) of the search range 450b is $H_p+L_a+L_b$. $L_a$ is the upper direction movement amount. $L_b$ is the lower direction movement amount.

The width (width of the search range) of the search range 450b is $W_p+L_1+L_r$. $L_1$ is the left direction movement amount. $L_r$ is the right direction movement amount.

Figure 9:
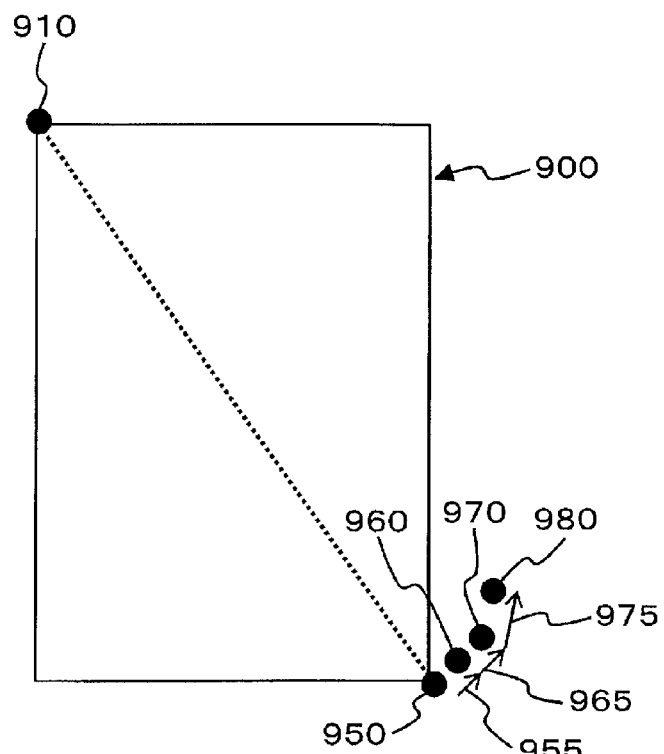
FIG. 9 is an explanation diagram illustrating the processing example of calculating the movement amount.
Figure 10:
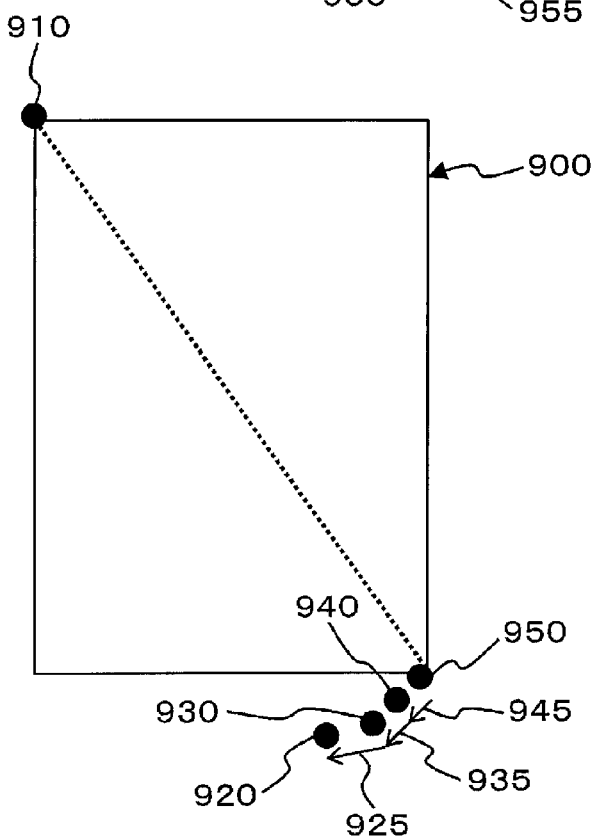
FIG. 10 is an explanation diagram illustrating the processing example of calculating the movement amount.

Meanwhile, the calculation of the movement amount 154 will be described with reference to examples of FIGS. 9 and 10.

Figure 2:
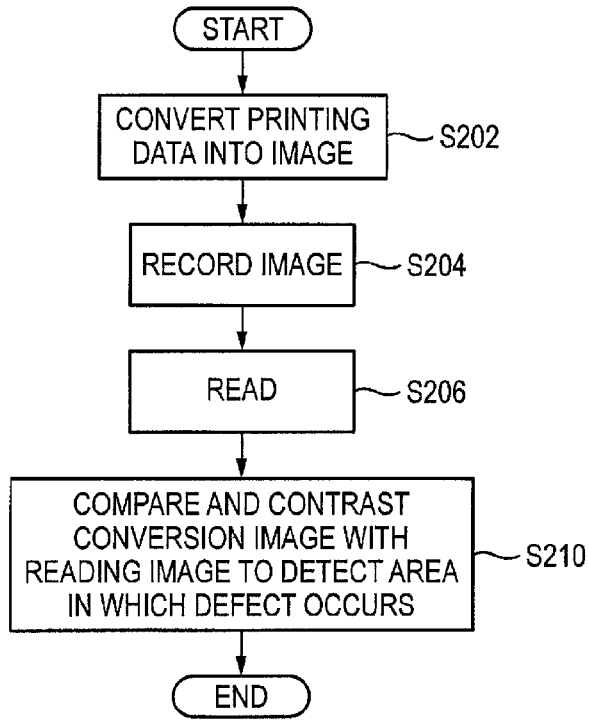
FIG. 2 is a flow chart illustrating a processing example according to the first embodiment of the present invention.

FIG. 2 is a flow chart illustrating a processing example according to the present embodiment.

In step S202, the image generating module 110 converts the printing data 105 into an image to generate the printing image 115.

In step S204, the recording module 120 records the printing image 115 on the recording medium 125.

In step S206, the reading module 130 reads the recording medium 125 on which the printing image 115 is recorded.

In step S210, the comparison and contrast module 160 compares and contrasts the conversion image (printing image 115) with the reading image 135 to detect an area in which defects occurs.

Figure 3:
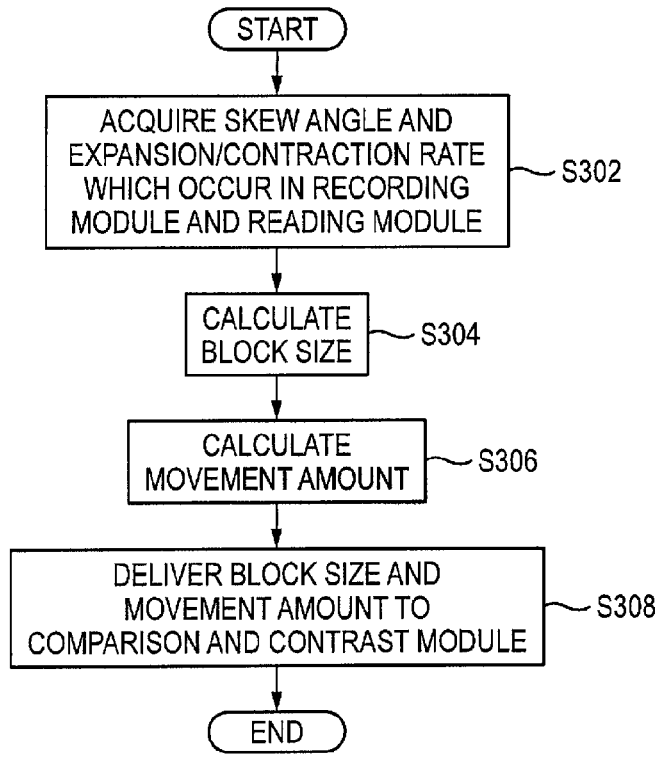
FIG. 3 is a flow chart illustrating a processing example of calculating a block size and a movement amount.

FIG. 3 is a flow chart illustrating a processing example in which the block and movement amount calculating module 150 calculates the block size 152 and the movement amount 154.

In step S302, the expansion and contraction rate and the rotation angle (skew angle), which may be generated from the recording module 120 and the reading module 130, are acquired.

In step S304, the block size is calculated.

In step S306, the movement amount is calculated.

In step S308, the block size 152 and the movement amount 154 are delivered to the comparison and contrast module 160.

Figure 8:
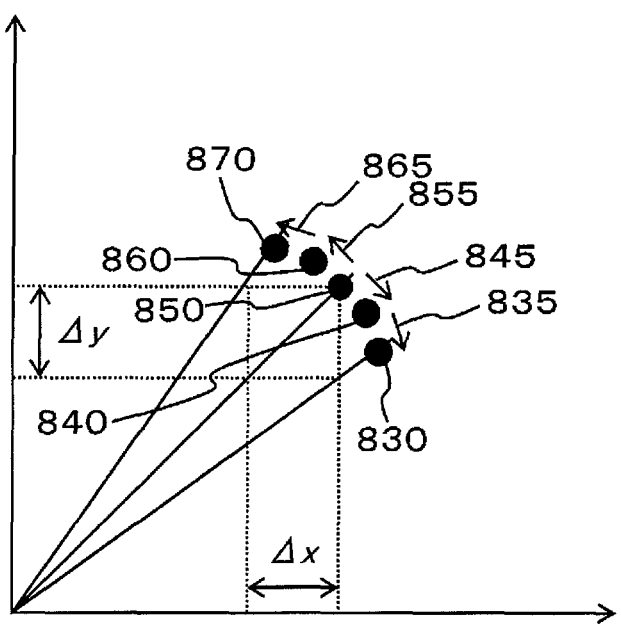
FIG. 8 is an explanation diagram illustrating the processing example of calculating the block size.

FIG. 8 is an explanation diagram illustrating a processing example of calculating the block size 152. When both the rotation and the expansion and contraction by the recording module 120 and the reading module 130 are generated in the worst state, the block size is set so that when a center of the block of the printing image 115 coincides with a center of the block of the reading image 135, the pixel shift at each corner is within 1 pixel.

The example of FIG. 8 illustrates how a point 850 within the printing image 115 is shifted by the errors from the recording module 120 and the reading module 130.

The point 850 moves to a point 860 by the movement (at the time of maximum contraction in both scanning directions) 855 due to expansion and contraction. Further, the point 850 moves to a point 870 by a movement (counterclockwise) 865 due to the skew. This corresponds to the case in which the contraction is maximal (smallest) and the counterclockwise rotation is maximal.

The point 850 moves to a point 840 by the movement (at the time of maximum expansion in the both scanning directions) 845 due to the expansion and contraction. Further, the point 850 moves to a point 830 by a movement (clockwise) 835 due to the skew. This corresponds to the case in which the expansion is maximal (largest) and the clockwise rotation is maximal.

(1) When in both scanning directions, the contraction is maximal (x-axis direction magnification: $r_1$ and y-axis direction magnification: $r_2$) and the skew is maximal (counterclockwise, rotation angle $\alpha$), if the movement amount of a point on a diagonal line which has the maximum movement amount based on a center of a block as an original point is calculated as (1, 1), the movement amount is represented by the following Equation (1).

[Equation 1]

$$\begin{bmatrix} \cos(\alpha) & -\sin(\alpha) \\ \sin(\alpha) & \cos(\alpha) \end{bmatrix} \begin{bmatrix} r_1 \\ r_2 \end{bmatrix} = \begin{bmatrix} x_1 \\ y_1 \end{bmatrix} \quad (1)$$

A difference $\Delta x$ of x in the case of a straight line passing through the point and y=1 as an original straight line is calculated. In the example of FIG. 8, the difference $\Delta x$ is defined by a straight line passing through the point 850, the original point, and the point 870 and a straight line of which y=1.

(2) Meanwhile, when in both scanning directions, the expansion is maximal (x-axis direction magnification: $r_3$ and y-axis direction magnification: $r_4$) and the skew is maximal (clockwise, rotation angle $\beta$), if the movement amount of a point on a diagonal line which has the maximum movement amount based on a center of a block as an original point is calculated as (1, 1), the movement amount is represented by the following Equation (2).

[Equation 2]

$$\begin{bmatrix} \cos(\beta) & \sin(\beta) \\ -\sin(\beta) & \cos(\beta) \end{bmatrix} \begin{bmatrix} r_3 \\ r_4 \end{bmatrix} = \begin{bmatrix} x_2 \\ y_2 \end{bmatrix} \quad (2)$$

A difference $\Delta y$ of y in the case of a straight line passing through the point and x=1 as an original straight line is calculated. In the example of FIG. 8, the difference $\Delta y$ is defined by a straight line passing through the point 850, the original point, and the point 830 and a straight line of which x=1. (3) y' and x' in which $\Delta x$ and $\Delta y$ are 1.4 are calculated. Further, if the width and height of the block are W and H, the width and height are represented by the following Equation (3).

[Equation 3]

$$W = 2 * \text{ceil}(x') + 1, H = 2 * \text{ceil}(y') + 1 \quad (3)$$

Meanwhile, ceil( ) is a function which rounds off below the decimal point.

Therefore, the block size 152 (W and H of Equation (3)) may be calculated. For example, the width and height of the block each become 100 pixels and 110 pixels, and the like.

Next, a processing example of calculating the movement amount 154 (size of search range) will be described using examples of FIGS. 9 and 10.

In the case in which all of the rotation, the expansion and contraction, and the movement by the recording module 120 and the reading module 130 are worst, the movement amount 154 is set to be able to consider the movement amount at the lower right corner in a certain paper size (for example, A elongation paper). Meanwhile, in the following coordinates, an upper left corner is defined to be an original point, a right direction and a lower direction are defined to be a positive value direction, and the rotation angle in a clockwise direction is defined to be a positive value direction.

Under the condition in which the movement amount in the upper right direction is maximal, the movement amount of the lower right corner (for example, coordinates (3897 and 5763) at 300 dpi in the A3 elongation paper), which has the maximum movement amount based on the upper left corner in a certain paper size as the original point, is calculated as represented by the following Equation (4).

[Equation 4]

$$M = M_{skew} + M_{size} + M_{shift} \quad (4)$$

However, $M_{skew}$ represents the movement amount by the skew, $M_{size}$ represents the movement amount by the expansion and contraction, and $M_{shift}$ represents the movement amount by the shift.

Here, the $M_{skew}$, the $M_{size}$, and the $M_{shift}$ each are represented by the following Equations (5), (6), and (7).

[Equation 5]

$$M_{shew} = \begin{cases} 3897 - \{3897 \times \cos(\gamma) - 5763 \times \sin(\gamma)\} = M_{askew} & \text{pixel (main scanning direction)} \\ 5763 - \{3897 \times \sin(\gamma) + 5763 \times \cos(\gamma)\} = M_{bskew} & \text{pixel (sub-scanning direction)} \end{cases} \quad (5)$$

[Equation 6]

$$M_{size} = \begin{cases} 3897 \times r_5 - 3897 = M_{asize} & \text{pixel (main scanning direction)} \\ 5763 \times r_6 - 5763 = M_{bsize} & \text{pixel (sub-scanning direction)} \end{cases} \quad (6)$$

-continued

[Equation 7]

$$M_{shift} = \begin{cases} s_1 \div 25.4 \times 300 = M_{ashift} & \text{pixel (main scanning direction)} \\ s_2 \div 25.4 \times 300 = M_{bshift} & \text{pixel (sub-scanning direction)} \end{cases} \quad (7)$$

Meanwhile, γ represents the rotation angle, $r_5$ and $r_6$ represent the expansion and contraction rate, and $s_1$ and $s_2$ represent the movement amount.

Therefore, γ, $r_5$ and $r_6$, and $s_1$ and $s_2$ are represented by the follow Equation (8).

[Equation 8]

$$M = \begin{cases} M_{askew} + M_{asize} + M_{ashift} = M_a & \text{pixel (main scanning direction)} \\ M_{bskew} + M_{bsize} + M_{bshift} = M_b & \text{pixel (sub-scanning direction)} \end{cases} \quad (8)$$

This will be described using an example of FIG. 9. FIG. 9 is an explanation diagram illustrating the processing example of calculating the movement amount.

A point 950 moves to a point 960 by a movement (maximal in the upper right direction) 955 due to the shift. Further, the point 950 moves to a point 970 by a movement (at the time of the maximum expansion in a main scanning direction and the maximum contraction in a sub-scanning direction) 965 due to the expansion and contraction. Further, the point 950 moves to a point 980 by a movement (counterclockwise) 975 due to the skew. That is, at the farthest point (lower right corner) from an original point 910 (upper left corner in FIG. 9) of an image 900, the maximum movement amount in the upper direction and the right direction is calculated.

Meanwhile, under the condition in which the movement amount in the lower left direction is maximal, the movement amount of the lower right corner (for example, A3 elongation paper), which has the maximum movement amount based on the upper left corner in a certain paper size as the original point, is calculated as represented by the following Equations (9), (10), and (11).

[Equation 9]

$$M_{shew} = \begin{cases} 3897 - \{3897 \times \cos(\theta) - 5763 \times \sin(\theta)\} = M_{cskew} & \text{pixel (main scanning direction)} \\ 5763 - \{3897 \times \sin(\theta) + 5763 \times \cos(\theta)\} = M_{dskew} & \text{pixel (sub-scanning direction)} \end{cases} \quad (9)$$

[Equation 10]

$$M_{size} = \begin{cases} 3897 \times r_7 - 3897 = M_{csize} & \text{pixel (main scanning direction)} \\ 5763 \times r_8 - 5763 = M_{dsize} & \text{pixel (sub-scanning direction)} \end{cases} \quad (10)$$

[Equation 11]

$$M_{shift} = \begin{cases} s_3 \div 25.4 \times 300 = M_{cshift} & \text{pixel (main scanning direction)} \\ s_4 \div 25.4 \times 300 = M_{dshift} & \text{pixel (sub-scanning direction)} \end{cases} \quad (11)$$

Meanwhile, θ represents the rotation angle, $r_7$ and $r_8$ represent the expansion and contraction rate, and $s_3$ and $s_4$ represent the movement amount.

Therefore, θ, $r_7$ and $r_8$, and $s_3$ and $s_4$ are represented by the follow Equation (12).

[Equation 12]

$$M = \begin{cases} M_{cskew} + M_{csize} + M_{cshift} = M_c & \text{pixel (main scanning direction)} \\ M_{dskew} + M_{dsize} + M_{dshift} = M_d & \text{pixel (sub-scanning direction)} \end{cases} \quad (12)$$

This will be described using an example of FIG. 10. FIG. 10 is an explanation diagram illustrating the processing example of calculating the movement amount.

The point 950 moves to a point 940 by a movement (maximal in the lower left direction) 945 due to the shift. Further, the point 950 moves to a point 930 by a movement (at the time of the maximum contraction in the main scanning direction and the maximum expansion in the sub-scanning direction) 935 due to the expansion and contraction. Further, the point 950 moves to a point 920 by a movement (clockwise) 925 due to the skew. That is, at the farthest point (lower right corner) from the original point 910 (upper left corner in FIG. 10) of the image 900, the maximum movement amount in the upper direction and the left direction is calculated.

From the above description, the upper direction maximum value, the lower direction maximum value, the left direction maximum value, and the right direction maximum value of the movement amount are each calculated. For example, the maximum values each are 67.41 pixels, 95.99 pixels, 58.73 pixels, and 62.47 pixels, and the movement amounts in the vertical and horizontal directions of the block each are a minimum of 68 pixels, 96 pixels, 59 pixels, and 63 pixels. Meanwhile, actually, since the recording module 120 and the reading module 130 may be out of the specification (spec over), the movement amounts may be set to be large by a predetermined value.

Second Embodiment

Figure 11:
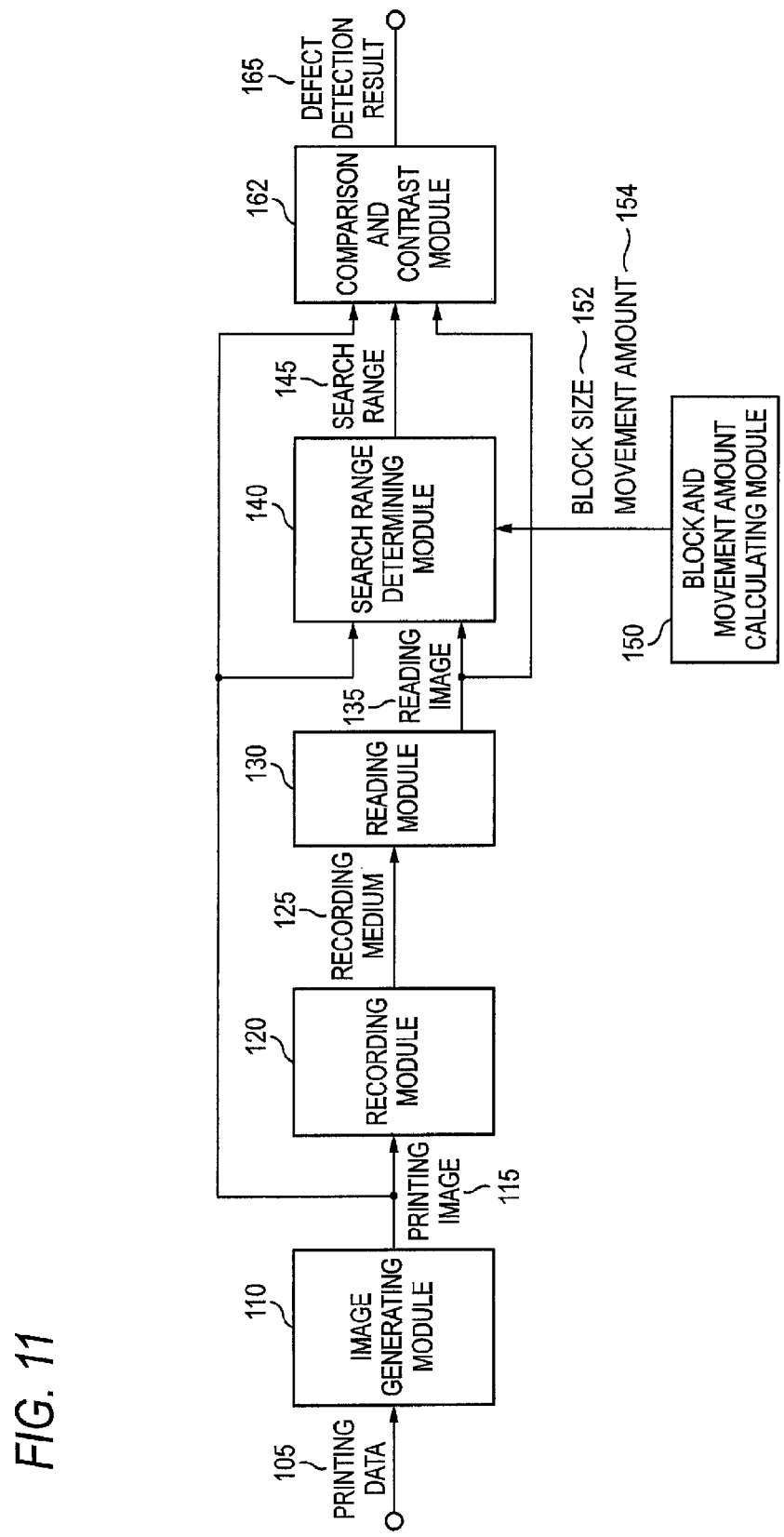
FIG. 11 is a conceptual module configuration diagram of a second embodiment of the present invention.

FIG. 11 is a conceptual module configuration diagram of a second embodiment of the present invention.

An image processing system including an image processing apparatus according to the second embodiment compares image data with reading data. As illustrated in an example of FIG. 11, the image processing system includes the image generating module 110, the recording module 120, the reading module 130, a search range determining module 140, and the block and movement amount calculating module 150, and a comparison and contrast module 162.

Unlike the first embodiment, the image processing system according to the second embodiment further includes the search range determining module 140. Hereinafter, points different from the first embodiment will be mainly described.

The image generating module 110 is connected to the recording module 120, the search range determining module 140, and the comparison and contrast module 162. The printing image 115 which is a processed result is delivered to the recording module 120, the search range determining module 140, and the comparison and contrast module 140.

The recording module 120 is connected to the image generating module 110 and the reading module 130.

The reading module 130 is connected to the recording module 120, the search range determining module 140, and the comparison and contrast module 162. The reading image 135 is delivered to the search range determining module 140 and the comparison and contrast module 162.

The search range determining module 140 is connected to the image generating module 110, the reading module 130, and the block and movement amount calculating module 150, and the comparison and contrast module 162. The search range determining module 162 determines the range of the movement amount defining the search range, based on the error which may occur from the recording module 120 recording the image of the printing image 115 on the recording medium 125 or the reading module 130 reading the recording medium 125, and the position within the image (whichever of the printing image 115 and the reading image 135 may be used). The 'errors which may occur from the recording module 120 or the reading module 130' will be described below in the description of the block and movement amount calculating module 150. For example, the search range determining module 140 increases the movement amount in accordance with the distance from the original point in the printing image 115 or the reading image 135, and calculates the movement amount at the farthest point from the original point so that the movement amount by the affine transformation, which is the error that may occur from the recording module 120 or the reading module 130, is maximal in the size of the printing image 115 or the reading image 135. Meanwhile, the distance from the original point has the same value as the position of the block. The original point of the printing image 115 or the reading image 135 is a position at which the occurrence of the error of the recording module 120 or the reading module 130 is minimal, and means, for example, the coordinates of the upper left corner of the image. The 'farthest point from the original point' is the farthest position from the original point. The farthest position from the original point is a position at which the occurrence of the error of the recording module 120 or the reading module 130 is maximal, and means, for example, the coordinates of the lower right corner of the image. In detail, the search range determining module 140 increases the size of the search range toward the direction of the coordinate of the lower right corner from the coordinate of the upper left corner. Further, the maximum size is defined by the maximum value of the 'errors which may occur from the recording module 120 or the reading module 130', and is the movement amount 154 which is calculated by the block and movement amount calculating module 150.

This will be described using an example of FIG. 13. FIG. 13 is an explanation diagram illustrating an example of the size of the search range based on the position within the image. (a) of FIG. 13 illustrates an example of positions of an original point 310 (upper left corner) and a farthest point 390 (lower right corner) in an image 300. Further, an example of (b) of FIG. 13 illustrates the relationship between a block 312 in the original point 310 and a search range 314. The search range 314 is large by a predetermined value (0 or more), when comparing with the block 312. An example of (c) of FIG. 13 illustrates the relationship between a block 392 in the farthest point 390 and a search range 394. The search range 394 is a size which is defined by the movement amount 154 calculated by the block and movement amount calculating module 150. Meanwhile, the sizes of the block 312 and the block 392 are the same as each other, and are the block size 152 calculated by the block and movement amount calculating module 150. An example in which the upper left corner is defined as the original point and the lower right corner is defined as the farthest point is illustrated herein, but according to a nature of errors which may occur from the recording module 120 or the reading module 130, whichever of the four points (lower right corner, upper right corner, lower left corner, and upper left corner) may be used. Herein, the rotation of the recording module 120 or the reading module 130 is generated based on the upper left corner and the case in which as the rotation is far from the upper left corner, the expansion and contraction has a great effect is described by way of example.

Next, the comparison and contrast module 162 searches for the extracted rectangular image in the search range determined by the search range determining module 140 within the other image (side FIGS. 4 to 6). Meanwhile, the comparison and contrast module 162 accepts a search range 145 from the search range determining module 140 to search for the targeted block.

Next, the comparison and contrast module 162 compares the extracted rectangular image with the image of the searched result based on the position in the searched result as the displacement amount. The 'search result' is a result of extracting a position at which one image best matches the other image by comparing the rectangular images within the one image, in the search range of the other image. The difference between the position and a position of the rectangular image may be set to be the displacement amount. The 'compare' may include using the searched result. That is, since the search result is the best matched case, the matched degree may be set as a defect detection result 165. Further, the defect detection result 165 may include the displacement amount in addition to the matched degree.

Figure 14:
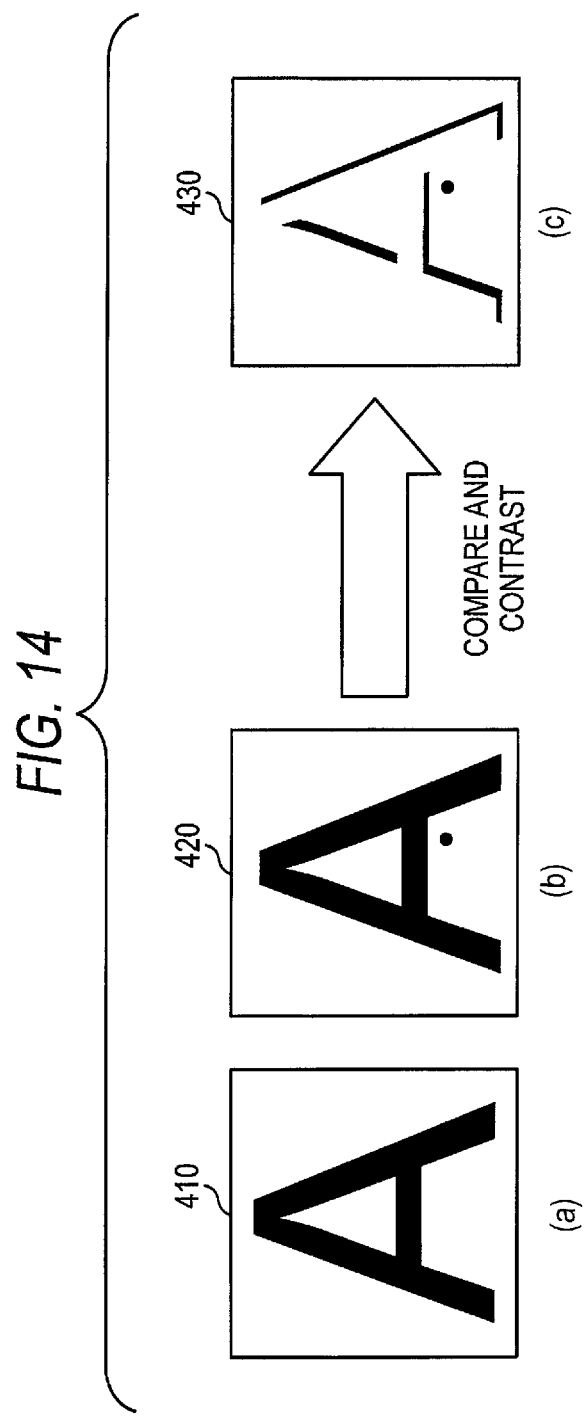
FIG. 14 is an explanation diagram illustrating a processing example of detecting a defect.

This will be described with reference to FIG. 14. FIG. 14 is an explanation diagram illustrating a processing example of the defect detection by the comparison and contrast module 162. A reading block image 410 illustrated in an example of (a) of FIG. 14 is the block image within the printing image 115, a reading block image 420 illustrated in an example of (b) of FIG. 14 is the block image within the reading image 135, and a difference block image 430 illustrated in an example of (c) of FIG. 14 is a difference (result of exclusive OR processing) between the printing block image 410 and the reading block image 420. The comparison and contrast module 162 generates difference images for each block and detects the defects within the difference images. As the defects, for example, the defect that one side of a circumscribed rectangle has a size of a predetermined range (for example, from three pixels to five pixels, and the like) may be detected.

The block and movement amount calculating module 150 is connected to the search range determining module 140. The block and movement amount calculating module 150 calculates the block size 152 and the movement amount 154 based on the error which may occur from the recording module 120 or the reading module 130. Further, the block size 152 and the movement amount 154 are delivered to the search range determining module 140. Examples of the error of the recording module 120 or the reading module 130 include the affine transformation in an image forming apparatus or an image reading apparatus. In a detailed example, the error includes an expansion and contraction rate, a rotation angle, and the like. Meanwhile, the processing by the block and movement amount calculating module 150 is sufficient to be carried out prior to carrying out the processing by the search range determining module 140, and the block size 152 and the movement amount 154 may be previously calculated and stored in the search range determining module 140. Further, to cope with the errors from the recording module 120 and the reading module 130 which are used at that time, the block and movement amount calculating module 150 may accept errors from the recording module 120 and the reading module 130 to calculate the block size 152 and the movement amount 154 each time.

Figure 12:
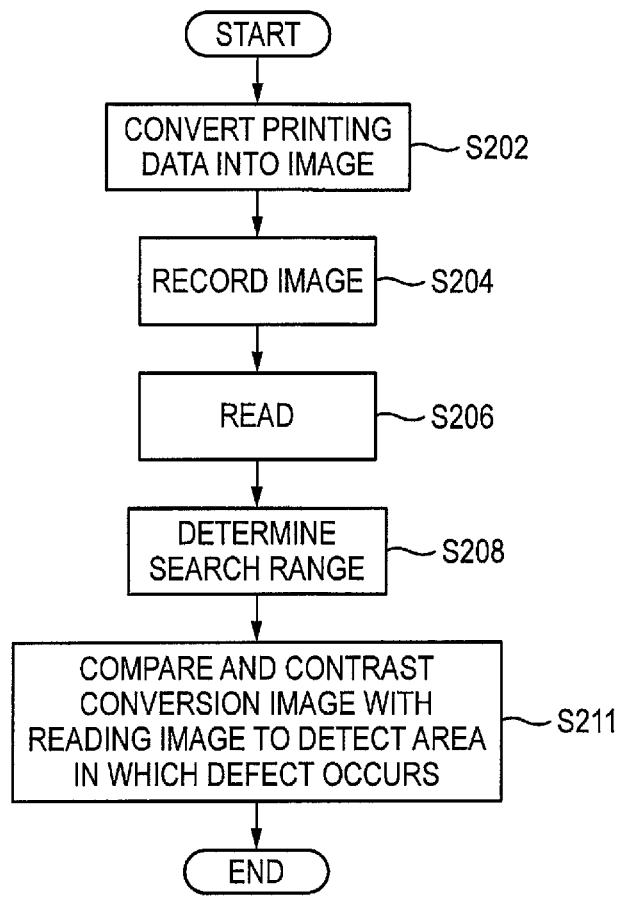
FIG. 12 is a flow chart illustrating a processing example according to the second embodiment of the present invention.

FIG. 12 is a flow chart illustrating a processing example according to the present embodiment.

In step S202, the image generating module 110 converts the printing data 105 into an image to generate the printing image 115.

In step S204, the recording module 120 records the printing image 115 on the recording medium 125.

In step S206, the reading module 130 reads the recording medium 125 on which the printing image 115 is recorded.

In step S208, the search range determining module 140 determines the search range 145 for each block.

In step S211, the comparison and contrast module 162 compares and contrasts the conversion image (printing image 115) with the reading image 135 to detect an area in which defects occurs.

Figure 15:
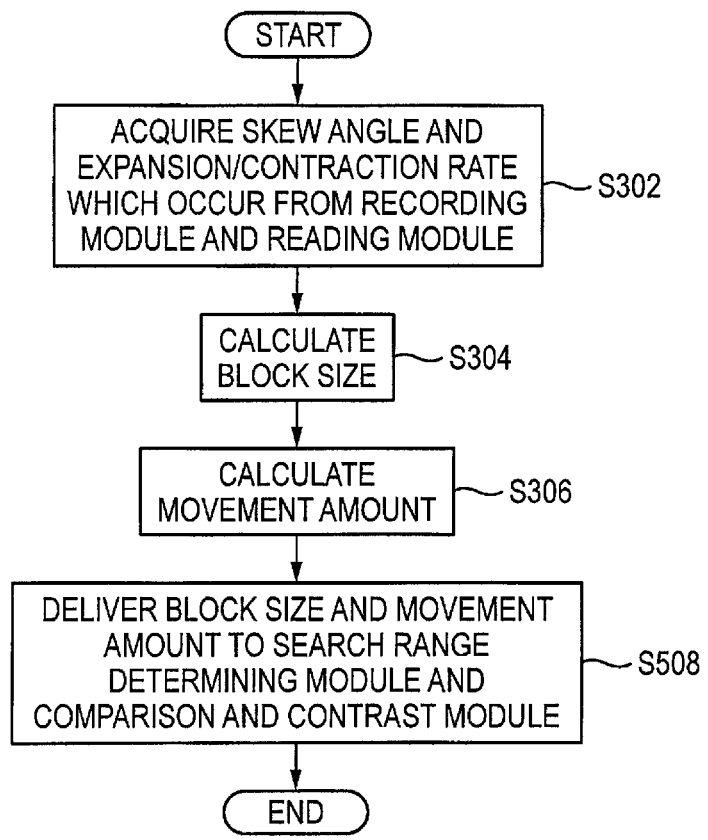
FIG. 15 is a flow chart illustrating a processing example of calculating a block size and a movement amount.
Figure 16:
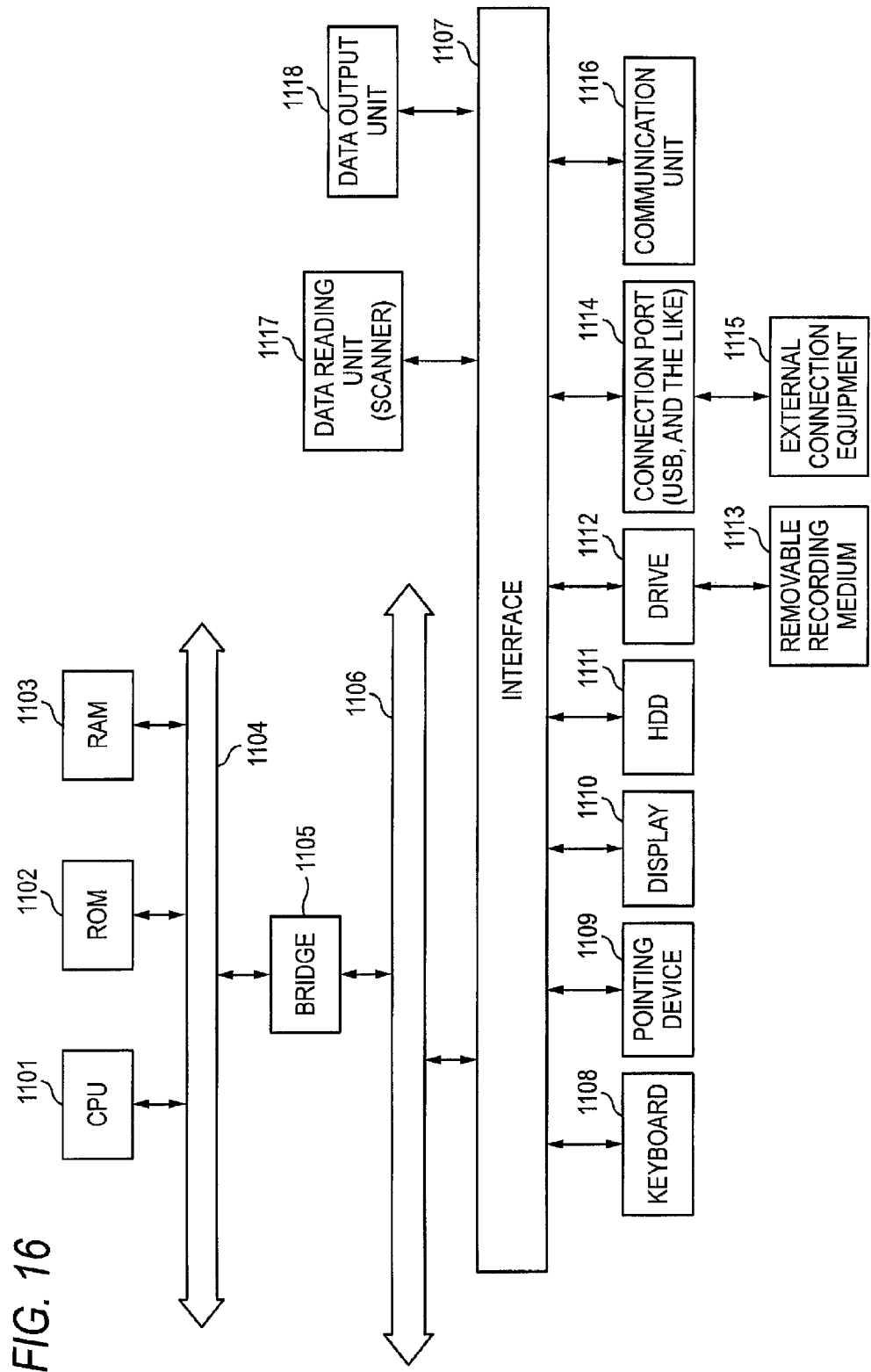
FIG. 16 is a block diagram illustrating a hardware configuration example of a computer realizing the present embodiments.

FIG. 15 is a flow chart illustrating a processing example in which the block and movement amount calculating module 150 calculates the block size 152 and the movement amount 154.

In step S302, the expansion and contraction rate and the rotation angle (skew angle) which may be generated from the recording module 120 and the reading module 130 are acquired.

In step S304, the block size is calculated.

In step S306, the movement amount is calculated.

In step S508, the block size 152 and the movement amount 154 are delivered to the search range determining module 140 and the comparison and contrast module 160.

A hardware configuration example of the image processing apparatus according to the present embodiment will be described with reference to FIG. 22. The configuration illustrated in FIG. 22 is configured by, for example, a personal computer (PC), and the like, and a hardware configuration example including a data reading unit 1117 such as a scanner and a data output unit 1118 such as a printer is illustrated.

A central processing unit (CPU) 1101 is a control unit which carries out processing according to computer programs which describe an execution sequence of each module of various modules described in the above-mentioned embodiments, that is, the comparison and contrast module 140, the image generating module 110, the block and movement amount calculating module 150, and the like.

A read only memory (ROM) 1102 stores programs, operation parameters, and the like which are used by the CPU 1101. A random access memory (RAM) 1103 stores programs which are used in the execution by the CPU 1101, parameters appropriately changed in the execution, and the like. These components are connected to each other by a host bus 1104 which is configured of a CPU bus, and the like.

The host bus 1104 is connected to an external bus 1106, such as a peripheral component interconnect/interface) bus, via a bridge 1105.

A pointing device such as a keyboard 1108 and a mouse is an input device which is operated by an operator. As a display 1110, there are a liquid crystal display device, a cathode ray tube (CRT), and the like, and the display 1110 displays various types of information as a text or image information.

A hard disk drive (HDD) 1111 includes a hard disk and drives the hard disk to record or reproduce programs or information which is executed by the CPU 1101. The hard disk stores the printing data 105, the printing image 115, the reading image 135, the block size 152, the movement amount 154, and the detect detection result 145, and the like. Further, the hard disk stores various computer programs such as other various data processing programs.

A drive 1112 reads data or programs which are recorded in removable recording media 1113, such as a magnetic disk, an optical disk, and a magneto-optical disk which are mounted therein or a semiconductor memory, and supplies the data or the programs to the RAM 1103 connected via an interface 1107, the external bus 1106, the bridge 1105, and the host bus 1104. The removable recording medium 1113 may also be used as a data recording region like the hard disk.

A connection port 1114 is a port which connects an external connection equipment 1115 and has connection units, such as USB and IEEE1394. The connection port 1114 is connected to the CPU 1101 via the interface 1107, the external bus 1106, the bridge 1105, the host bus 1104, and the like. A communication unit 1116 is connected to a communication line to carry out the data communication processing with the outside. The data reading unit 1117 is, for example, a scanner and carries out reading processing of a document. The data output unit 1118 is, for example, a printer and carries out output processing of document data.

Meanwhile, the hardware configuration of the image processing apparatus illustrated in FIG. 22 represents one configuration example, and the present embodiment is not limited to the configuration illustrated in FIG. 22, but any configuration which may carry out the modules described in the present embodiments may be used. For example, some modules may be configured of dedicated hardware (for example, application specific integrated circuit (ASIC), and the like), and may have a form that the modules are connected to each other by the communication line within the external system, and the systems illustrated in FIG. 22 may be connected to each other by a plurality of mutual communication lines to perform the cooperative operation. Further, the system may be embedded in a copier, a facsimile, a scanner, a printer, a multi-function printer (image processing apparatus having at least two functions of the scanner, the printer, the copier, the facsimile, and the like), and the like.

Meanwhile, the present embodiment may be the image processing apparatus including the comparison and contrast module 160 (comparison and contrast module 162) and may include the block and movement amount calculating module 150, the reading module 130, the recording module 120, and the image generating module 110.

Meanwhile, the aforementioned programs may be stored and provided in the recording medium and may be provided by the communication means. In this case, for example, the aforementioned programs may be understood as the invention of 'computer readable recording medium recorded with program'.

The 'computer readable recording medium recorded with program' means a recording medium which may be readable with a computer recorded with programs which are used for install and execution of the programs, distribution of the programs, and the like.

Meanwhile, examples of the recording medium may include a digital versatile disc (DVD), 'DVD-R, DVD-RW, DVD-RAM, and the like' which are standards set in a DVD forum, 'DVD+R, DVD+RW, and the like' which are standards set in DVD+RW, a compact disc (CD), a Blu-ray (registered mark) disc such as a read only memory (CD-ROM), a CD recordable (CD-R), and CD rewritable (CD-RW), a magneto-optical disc (MO), a flexible disc (FD), a magnetic tape, a hard disk, a read only memory (ROM), an electrically erasable and programmable read only member (EEPROM (registered mark)), a flash memory, a random access memory (RAM), a secure digital (SD) memory card, and the like.

The programs or some of the programs may be recorded and stored in the recording medium or may be distributed. Further, the programs may be transmitted by using communication, for example, a transmission medium such as a wired network, a wireless communication network, or a combination thereof which is used in a local area network (LAN), a metropolitan area network (MAN), a wide area network (WAN), the Internet, the Intranet, the Extranet, and the like, and may be carried on a carrier wave to be carried.

In addition, the programs may be a part of other programs and may be recorded in the recording medium along with separate programs. Further, the programs may be separately recorded in a plurality of recording media. Further, if the programs may be recovered, the programs may be recorded in any aspect such as compression and encryption.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:
    an acceptance unit that accepts image data and reading data, the reading data being read by an image reading apparatus from a medium on which an image of the image data is formed by an image forming apparatus;
    an extraction unit that extracts a rectangular image by segmenting one image of the image data and the reading data to have a size based on a tolerable error which occurs from the image forming apparatus and/or the image reading apparatus reading the medium, the tolerable error being predetermined in design specification of the image forming apparatus and the image reading apparatus;
    a searching unit that searches for a matching image in the other image of the image data and the reading data, which corresponds to a position of the rectangular image extracted by the extraction unit within a range of movement amounts based on the size of the rectangular image and the tolerable error; and
    a comparison unit that compares the rectangular image extracted by the extraction unit with the matching image searched by the searching unit.

2. The image processing apparatus of claim 1, further comprising:
    a determination unit that determines the range of the movement amounts based on the size of the rectangular image extracted by the extraction unit, tolerable error and the position of the rectangular image,
    wherein at the matching position searched by the searching unit, a matching degree of the rectangular image and the matching image is highest within the range of the movement amounts.

3. The image processing apparatus of claim 1, wherein the size of the rectangular image is set so that, when a center of the rectangular image coincides with a center of the matching image, a pixel shift at each corner is within one pixel, even if rotation, expansion and contraction occurred from the image forming apparatus or the image reading apparatus in a worst condition.

4. The image processing apparatus of claim 1,
    wherein the tolerable error is generated by an affine transformation performed in the image forming by the image forming apparatus and/or the image reading by the image reading apparatus.

5. The image processing apparatus of claim 2,
    wherein the determination unit determines the range of the movement amounts in proportion to a distance from an original point in the one image to the position of the rectangular image therein, and
    the original point is a position at which the tolerable error from the image forming apparatus or the image reading apparatus is minimal.

6. The image processing apparatus of claim 1, wherein the tolerable error is generated by an affine transformation performed in the image forming by the image forming apparatus and/or the image reading by the image reading apparatus.

7. The image processing apparatus of claim 5,
    wherein the tolerable error is generated by an affine transformation performed in the image forming by the image forming apparatus and/or the image reading by the image reading apparatus.

8. The image processing apparatus of claim 7,
    wherein the movement amounts are increased in accordance with the distance from the original point in the one image to the position of the rectangular image therein,
    the size of the rectangular image extracted by the extraction unit at a farthest point from the original point is set so that, when a center of the rectangular image at the farthest point coincides with a center of the matching image, a pixel shift at each corner is within one pixel, even if rotation, expansion and contraction occurred from the image forming apparatus or the image reading apparatus in the worst condition.

* * * * *